United States Patent
Ogino et al.

(10) Patent No.: US 10,621,320 B2
(45) Date of Patent: Apr. 14, 2020

(54) OPERATOR IDENTIFICATION SYSTEM

(71) Applicant: FANUC CORPORATION, Minamitsuru-gun, Yamanashi (JP)

(72) Inventors: Hideo Ogino, Yamanashi (JP); Keisuke Tsujikawa, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 161 days.

(21) Appl. No.: 15/839,123

(22) Filed: Dec. 12, 2017

(65) Prior Publication Data

US 2018/0165438 A1 Jun. 14, 2018

(30) Foreign Application Priority Data

Dec. 12, 2016 (JP) .................................. 2016-240525

(51) Int. Cl.
*G06F 21/00* (2013.01)
*G06F 21/32* (2013.01)
(Continued)

(52) U.S. Cl.
CPC .......... *G06F 21/32* (2013.01); *G05B 19/409* (2013.01); *G05B 19/4183* (2013.01);
(Continued)

(58) Field of Classification Search
CPC .......... G06F 21/31; G06F 21/32; G06F 21/34; G06F 21/40; G06F 21/45; G06F 21/604;
(Continued)

(56) References Cited

U.S. PATENT DOCUMENTS

| 7,950,063 B2* | 5/2011 | Oelsner | G06F 21/34 726/28 |
| 8,000,502 B2* | 8/2011 | Dave | G06F 21/32 340/521 |

(Continued)

FOREIGN PATENT DOCUMENTS

| EP | 2034378 A2 | 3/2009 |
| EP | 2458463 A1 | 5/2012 |

(Continued)

OTHER PUBLICATIONS

Notification of Reasons for Refusal for Japanese Application No. 2016-240525, dated Jun. 19, 2018, with translation, 10 pages.

(Continued)

*Primary Examiner* — Hosuk Song
(74) *Attorney, Agent, or Firm* — RatnerPrestia

(57) ABSTRACT

The operator identification system is capable of managing the information required for authentication of operators centrally with high operation rate. The operator identification system includes a manufacturing cell including a manufacturing machine and a cell controller that can communicate with the manufacturing machine. The cell controller includes a first operator identification information acquisition unit for acquiring operator identification information, a first operation permission/inhibition information storage unit for storing operation permission/inhibition information of the operator on the manufacturing machine, and a first operator identification unit for determining an operation executable by the operator on the manufacturing machine based on the operator identification information and the operation permission/inhibition information. The manufacturing machine includes a second operator identification (Continued)

information acquisition unit, a second operation permission/inhibition information storage unit, a second operator identification unit, and an operation unit for accepting the operation by the operator. The operation unit executes the operation determined to be executable by the first operator identification unit or the second operator identification unit.

12 Claims, 11 Drawing Sheets

(51) Int. Cl.
| | | |
|---|---|---|
| *G06Q 50/04* | (2012.01) | |
| *G07C 11/00* | (2006.01) | |
| *G06F 21/31* | (2013.01) | |
| *G05B 19/409* | (2006.01) | |
| *G05B 19/418* | (2006.01) | |
| *G06F 21/60* | (2013.01) | |
| *G06F 21/34* | (2013.01) | |
| *G06F 21/40* | (2013.01) | |
| *G06F 21/45* | (2013.01) | |

(52) U.S. Cl.
CPC ....... *G05B 19/41815* (2013.01); *G06F 21/31* (2013.01); *G06F 21/34* (2013.01); *G06F 21/40* (2013.01); *G06F 21/45* (2013.01); *G06F 21/604* (2013.01); *G06Q 50/04* (2013.01); *G07C 11/00* (2013.01); *G05B 2219/24162* (2013.01); *G05B 2219/24167* (2013.01); *G05B 2219/32398* (2013.01); *G05B 2219/36163* (2013.01); *Y02P 90/10* (2015.11)

(58) Field of Classification Search
CPC ............ G05B 19/409; G05B 19/41815; G05B 19/4183; G05B 2219/32398
See application file for complete search history.

(56) References Cited

U.S. PATENT DOCUMENTS

| | | | | |
|---|---|---|---|---|
| 8,056,126 | B2* | 11/2011 | Otake | .................. G06F 21/608 |
| | | | | 358/1.14 |
| 8,430,325 | B2* | 4/2013 | Jain | .................. G06K 19/07739 |
| | | | | 235/492 |
| 8,661,527 | B2* | 2/2014 | Kato | ..................... H04L 9/0869 |
| | | | | 726/17 |
| 2005/0251685 | A1 | 11/2005 | Oelsner | |
| 2006/0064753 | A1 | 3/2006 | Otake et al. | |
| 2006/0085839 | A1 | 4/2006 | Brandt et al. | |
| 2006/0123463 | A1 | 6/2006 | Yeap et al. | |
| 2009/0079537 | A1 | 3/2009 | Seitz et al. | |
| 2012/0116547 | A1 | 5/2012 | Shigehara | |
| 2012/0166485 | A1 | 6/2012 | Tashiro et al. | |
| 2014/0082723 | A1 | 3/2014 | Schüepp | |
| 2016/0094756 | A1 | 3/2016 | Onishi | |
| 2017/0220008 | A1 | 8/2017 | Takahashi et al. | |

FOREIGN PATENT DOCUMENTS

| | | |
|---|---|---|
| EP | 1640836 B1 | 5/2013 |
| EP | 2711796 A1 | 3/2014 |
| JP | 2004134989 A | 4/2004 |
| JP | 2005346702 A | 12/2005 |
| JP | 2006092018 A | 4/2006 |
| JP | 2008059237 A | 3/2008 |
| JP | 2008176488 A | 7/2008 |
| JP | 2012137931 A | 7/2012 |
| JP | 2012-243046 A | 12/2012 |
| JP | 2014215853 A | 11/2014 |
| JP | 2016066241 A | 4/2016 |
| JP | 6031202 B1 | 11/2016 |
| WO | 2014049871 A1 | 4/2014 |

OTHER PUBLICATIONS

Notification of Reasons for Refusal for Japanese Application No. 2016-240525, dated Sep. 4, 2018, with translation, 19 pages.
German Examination Report for German Application No. 10 2017 011 4641, dated Feb. 13, 2020 with partial translation, 11 pages.

* cited by examiner

FIG. 3

| OPERATOR ID | NAME | EMPLOYEE NUMBER | MACHINE 1 MANAGER | MACHINE 1 DRIVING | MACHINE 1 PARAMETER CHANGE | MACHINE 1 MACHINING PROGRAM EDITING |
|---|---|---|---|---|---|---|
| 1000 | X | 900012 | ○ | PERMITTED | PERMITTED | PERMITTED |
| 0002 | B | 010538 | × | PERMITTED | PERMITTED | INHIBITED |

FIG. 4

| MACHINE | OPERATION | OPERATOR ID | TIME |
|---|---|---|---|
| MACHINE 1 | CHANGE FROM SCREEN 1 TO SCREEN 2 | 0002 | 2016.10.01 13:00:00 |
| MACHINE 1 | PUSH MDI RESET KEY | 0002 | 2016.10.01 13:12:47 |
| MACHINE 1 | PUSH CURSOR RIGHT KEY | 0002 | 2016.10.01 13:20:19 |

FIG. 6

| OPERATOR ID | NAME | EMPLOYEE NUMBER | MACHINE 1 DRIVING | MACHINE 1 PARAMETER CHANGE | MACHINE 1 MACHINING PROGRAM EDITING |
|---|---|---|---|---|---|
| 0001 | A | 110425 | PERMITTED | PERMITTED | PERMITTED |
| 0002 | B | 010538 | PERMITTED | PERMITTED | INHIBITED |

FIG. 7

| IDENTIFICATION TIME | OPERATOR ID | NAME | EMPLOYEE NUMBER | OPERATION TARGET | IDENTIFICATION LOCATION | IDENTIFICATION MEANS |
|---|---|---|---|---|---|---|
| 2016.10.01 08:40:19 | 0002 | B | 010538 | CELL 1 - MACHINE 1 | CELL CONTROLLER | FINGERPRINT |
| 2016.10.01 08:41:07 | 0001 | A | 110425 | CELL 2 - MACHINE 4 | CELL CONTROLLER | PASSWORD |
| 2016.10.01 08:42:34 | 0003 | C | 160391 | CELL 1 - MACHINE 2 | CELL CONTROLLER | FINGERPRINT |
| 2016.10.01 09:56:47 | 0002 | B | 010538 | CELL 1 - MACHINE 1 | MACHINE 1 | IC CARD |

FIG. 9

| MACHINE | OPERATION | OPERATOR ID | TIME |
|---|---|---|---|
| MACHINE 1 | CHANGE FROM SCREEN 1 TO SCREEN 2 | 0002 | 2016.10.02 13:00:00 |
| MACHINE 1 | PUSH MDI RESET KEY | 0002 | 2016.10.02 13:12:47 |
| MACHINE 1 | PUSH CURSOR RIGHT KEY | 0002 | 2016.10.02 13:20:19 |
| MACHINE 2 | CHANGE FROM SCREEN 4 TO SCREEN 3 | 0003 | 2016.10.01 09:38:12 |
| MACHINE 2 | PUSH CURSOR UP KEY | 0003 | 2016.10.01 09:38:20 |
| MACHINE 2 | PUSH INPUT KEY | 0003 | 2016.10.01 09:38:34 |
| MACHINE 3 | PUSH EMERGENCY STOP BUTTON | 0001 | 2016.10.03 19:57:07 |

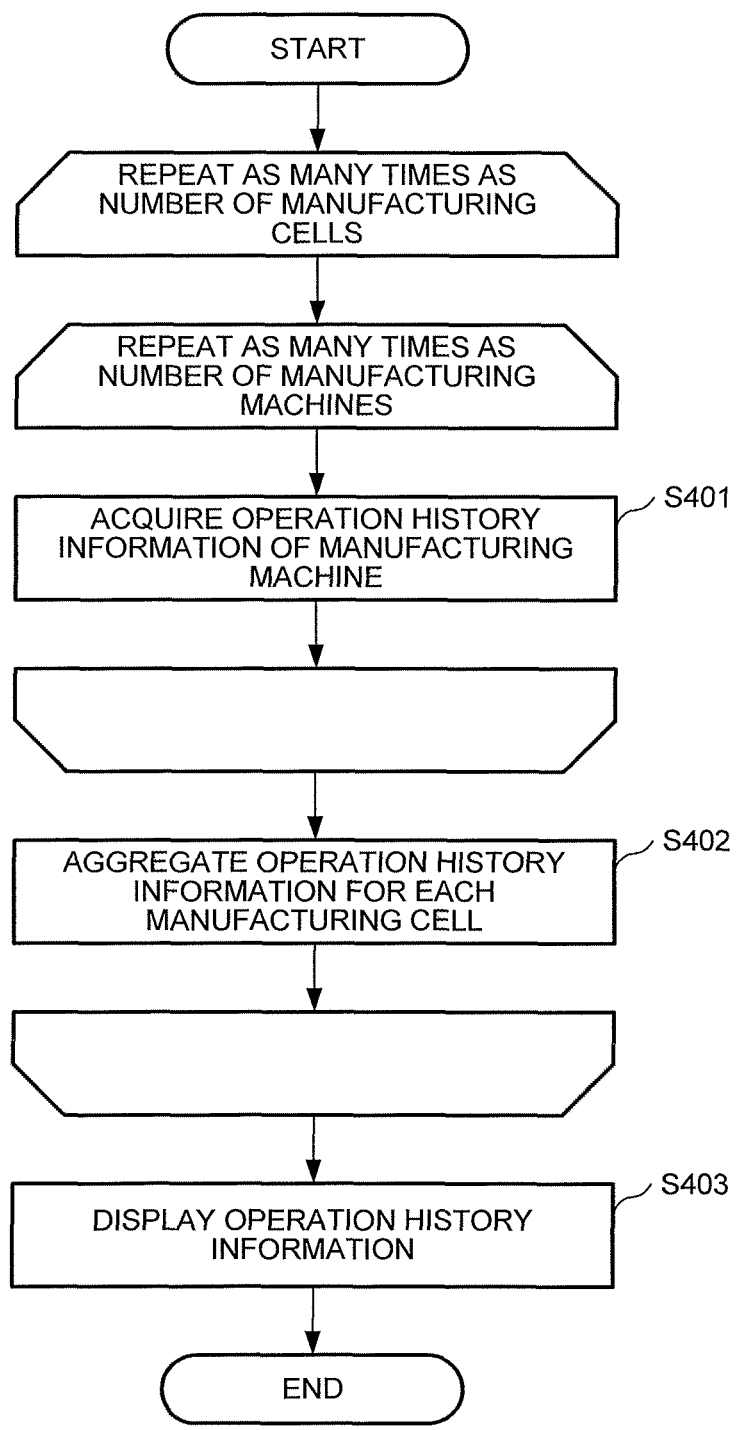

OPERATOR IDENTIFICATION SYSTEM

CROSS-REFERENCE TO RELATED APPLICATIONS

This application is a new U.S. Patent Application that claims benefit of Japanese Patent Application No. 2016-240525, filed Dec. 12, 2016, the disclosure of this application is being incorporated herein by reference in its entirety for all purposes.

BACKGROUND OF THE INVENTION

1. Field of the Invention

The present invention relates to an operator identification system, and more particularly, to a technology for identifying an operator who operates a manufacturing machine in a cell control system where a cell controller manages a manufacturing cell composed of a plurality of manufacturing machines.

2. Description of the Related Art

A manufacturing cell includes a plurality of different types of manufacturing machines, such as machine tools, robots, and programmable logic controllers (PLCs). An information processing device called a cell controller manages these multiple manufacturing machines. The cell controller acquires various manufacturing information of each unit or each product from these multiple manufacturing machines and uses the information for various managements necessary for manufacturing such as process management, quality management, and safety management.

Normally, in such a manufacturing machine, it is necessary to permit an operation by a person who is authorized to perform the operation, but not to permit an operation by a person who is not authorized to perform the operation. In other words, it is necessary to identify and authenticate the operator of the manufacturing machine. For example, since various data (for example, machining programs, parameters, ladders, etc.) held by a control device of a manufacturing machine represented by a numerical controller often includes knowhow specific to machine manufacturers or users, it is necessary to set a certain limit on the operation so that it cannot be changed, altered, or exported to the outside.

Conventionally, a system has been proposed in which operators are classified into several levels of operation, and operations that can be performed are predetermined according to the operation level. For example, Japanese Patent Application Laid-Open No. 2012-243046 discloses a production facility system which includes a production facility including a production machine, a fingerprint reading unit for reading fingerprint data of an operator of the production machine, and a control unit for controlling the production machine, and an authentication server connected to the production facility via a network for authenticating the fingerprint data of the operator of the production machine. The control unit of the production facility is configured so that the production machine can be operated in accordance with the operation level of the operator of the production machine based on the authentication result of the fingerprint data by the authentication server.

However, in the system described in Japanese Patent Application Laid-Open No. 2012-243046, there is a problem that the operator cannot be authenticated to operate the production machine, for example, when a connection between the production facility and the authentication server is cut off due to a network failure or the like. In addition, since the fingerprint reading unit is provided for each production machine, there is a problem that an introduction cost is high and it is necessary for the operator to be certified for each production machine when the operator operates multiple production machines. In addition, since it is necessary to set and store an operation level of the operator for each production machine to an authentication server, there is a problem that the setting becomes complicated when one operator operates multiple production machines.

In addition, from the viewpoints of process management, quality management, safety management and security management, there is a problem that the operator desires to acquire, store, and use a history of when and what kind of operation the operator performed on the manufacturing machine or the control machine. The operation history information saved by the conventional system cannot specify up to which operator was performing the operation and analyze the cause of the problem. In addition, in conventional systems, it is common to store the operation history information in the control devices of individual manufacturing machines, and it was not easy to integrate and verify operational history information of multiple manufacturing machines and control devices. Therefore, for example, even in cases where there is a difference in machining time or machining accuracy depending on the operator in the same manufacturing process, it was difficult to realize a process of analyzing the operator and the operation contents at that time and reflecting them on subsequent machine operation instructions.

SUMMARY OF THE INVENTION

The invention has been made to solve the aforementioned various problems, and intends to provide an operator identification system capable of managing the information required for authentication of operators centrally with high operation rate.

An operator identification system according to an embodiment of the invention includes one or more manufacturing cells including one or more manufacturing machines that are operated by an operator and a cell controller connected to each of the manufacturing machines communicatively. The cell controller includes a first operator identification information acquisition unit for acquiring operator identification information for identifying the operator, a first operation permission/inhibition information storage unit for storing operation permission/inhibition information indicating operations executable on the manufacturing machine by the operator, and a first operator identification unit for determining an operation executable by the operator on the manufacturing machine based on the operator identification information and the operation permission/inhibition information. The manufacturing machine includes a second operator identification information acquisition unit for acquiring operator identification information for identifying the operator, a second operation permission/inhibition information storage unit for storing operation permission/inhibition information indicating the operation executable on the manufacturing machine by the operator, a second operator identification unit for determining an operation executable on the manufacturing machine by the operator based on the operator identification information and the operation permission/inhibition information, and an operation unit for accepting the operation by the operator. The operation unit executes the operation when the operation by the operator is an operation determined to be executable by the first operator identification unit or the second operator identification unit.

In the operator identification system according to another embodiment, the first operator identification unit or the second operator identification unit performs the determination again for the operator when a predetermined condition is satisfied.

In the operator identification system according to another embodiment, the second operator identification unit performs the determination again when a predetermined period of time has elapsed after the first operator identification unit or the second operator identification unit determines a predetermined operation as being executable.

In the operator identification system according to another embodiment, the second operator identification unit performs the determination again when a problem occurs in the communication between the manufacturing machine and the cell controller.

In the operator identification system according to another embodiment, the second operator identification unit performs the determination again when the operation unit is not operated for a predetermined period of time.

In the operator identification system according to another embodiment, the cell controller further includes a machine operation instruction unit for controlling an operation state of the manufacturing machine, and the second operator identification unit performs the determination again when an instruction is given by the instruction unit.

In the operator identification system according to another embodiment of the invention, when the predetermined condition is satisfied, the operation unit stops executing the operation until the first operator identification unit or the second operator identification unit performs the determination for the operator again.

In the operator identification system according to another embodiment of the invention, the first operator identification information acquisition unit acquires the operator identification information from any one of biological information of the operator, secret information stored by the operator, and an equipment possessed by the operator, and the second operator identification information acquisition unit acquires the operator identification information from any one of the secret information stored by the operator and the equipment possessed by the operator.

In the operator identification system according to another embodiment, the second operation permission/inhibition information storage unit acquires the operation permission/inhibition information for the manufacturing machine from the first operation permission/inhibition information storage unit.

In the operator identification system according to another embodiment, when a plurality of the operators attempt to operate the same manufacturing machine, the first operator identification unit or the second operator identification unit performs only the operation by at least one operator.

In the operator identification system according to another embodiment, when a plurality of the operators perform the operation on the same manufacturing machine, the first operator identification unit or the second operator identification unit applies the same authority as that of the operator with the fewest executable operations among the plurality of the operators to all the operators.

In the operator identification system according to another embodiment, when the determination is performed again with respect to the operator, the first operator identification unit or the second operator identification unit uses the operator identification information which is different from that used in the previous determination.

Another embodiment of the present invention intends to provide an operator identification system that can acquire operation history for each operator and can easily reflect it on the contents of operation instructions to the manufacturing machine as necessary based on the history. In the operator identification system according to another embodiment, the manufacturing machine further includes an operation history information acquisition unit for acquiring operation history information including information regarding operation performed on the manufacturing machine and information regarding the operator who performed the operation, and the cell controller further includes an operation history information storage unit for obtaining and storing the operation history information from the operation history information acquisition unit. According to the embodiment, it is possible to provide the operator identification system capable of obtaining the operation history of each operator.

According to the invention, it is possible to provide the operator identification system capable of managing the information required for authentication of the operator centrally with high operation rate.

BRIEF DESCRIPTION OF THE DRAWINGS

The foregoing and other objects and features of the invention will become apparent from the following description of the embodiments with reference to the attached drawings, wherein:

FIG. 3 is a diagram illustrating an example of a second operation permission/inhibition information storage unit;

FIG. 4 is a diagram illustrating an example of operation history information generated by an operation history information acquisition unit and stored in an operation history information storage unit;

FIG. 6 is a diagram showing an example of operation permission/inhibition information in an embodiment;

FIG. 7 is a diagram illustrating an example of log information of an operator identification processing in an embodiment;

FIG. 9 is a diagram illustrating a display example of contents of an operation history information storage unit in an embodiment;

FIG. 13 is a flowchart illustrating an aggregation process of operation history information.

DETAILED DESCRIPTION OF THE PREFERRED EMBODIMENTS

Figure 1:
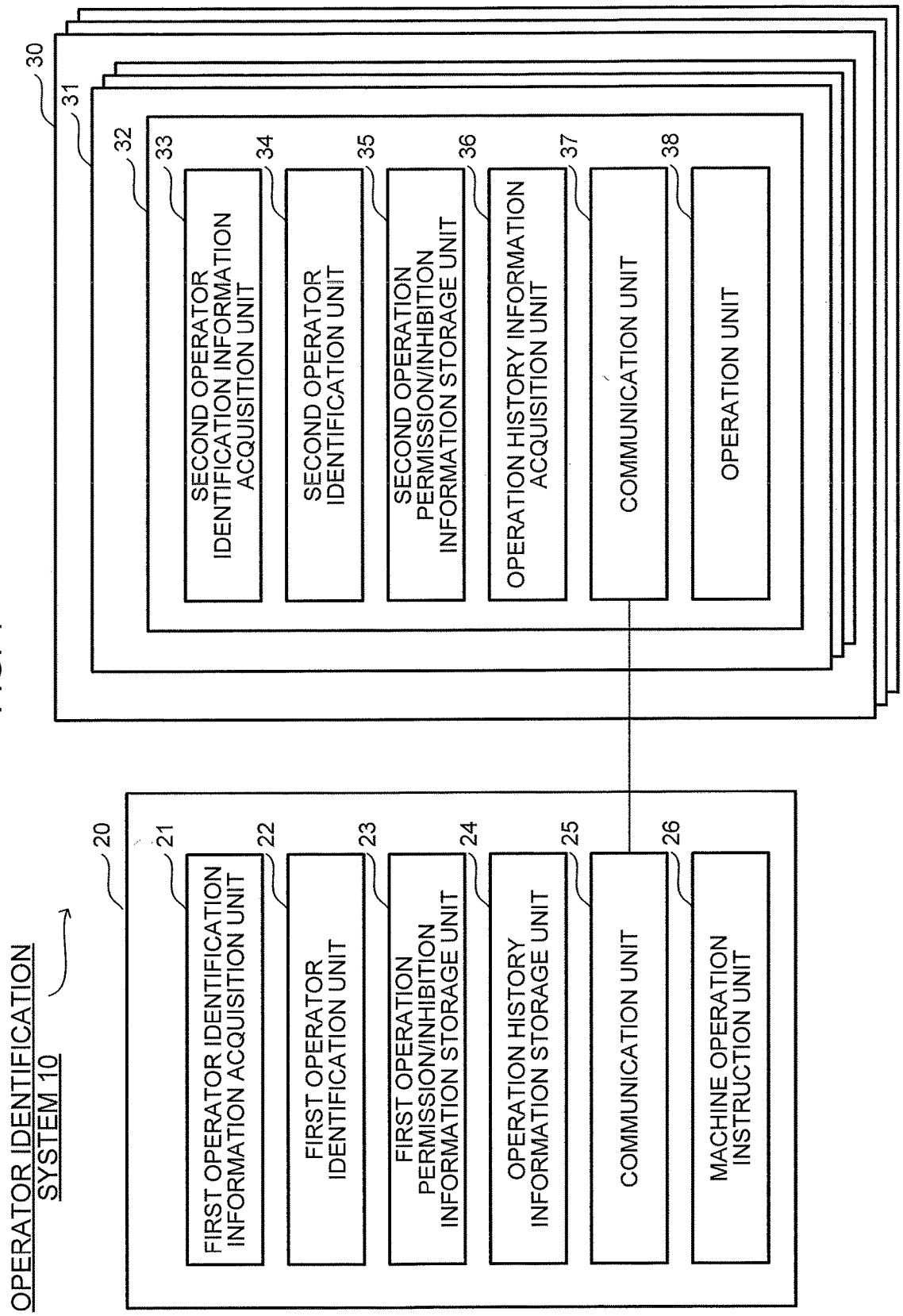
FIG. 1 is a block diagram illustrating a configuration of an operator identification system.

Hereinafter, the embodiment of the invention will be described together with the drawings. FIG. 1 is a block diagram illustrating a configuration of an operator identification system 10 according to an embodiment of the invention. The operator identification system 10 includes at least one cell controllers 20 and one or more manufacturing cells 30. Each of the cell controllers 20 is communicatively connected to one or more manufacturing cells 30.

Each of the cell controllers 20 includes a first operator identification information acquisition unit 21, a first operator identification unit 22, a first operation permission/inhibition information storage unit 23, an operation history information storage unit 24, and a communication unit 25.

The first operator identification information acquisition unit 21 is a device that acquires information (hereinafter, referred to as operator identification information) for identifying the operator from the operator. Examples of the operator identification information may include biometric information such as fingerprint, iris or voiceprint, secret information such as an ID and a password stored by an operator, encrypted secret information stored in a storage medium such as an IC card or a USB dongle possessed by the operator, and any information by which the operator can be identified, such as a device such as a key possessed by the operator, a one-time password, or the like. Further, the first operator identification information acquisition unit 21 can acquire information for specifying a manufacturing machine 31 to be operated by the operator. For example, the information for specifying the manufacturing machine 31 to be operated by the operator may be input by the operator from an input unit which is not illustrated in the drawing or may be read out the stored information together with the operator identification information in the storage medium by the first operator identification information acquisition unit 21. Alternatively, when the operator identification information and information for specifying the manufacturing machine 31 are stored in a corresponding manner in a storage area or the like which is not illustrated, the first operator identification information acquisition unit 21 may refer to the storage area and specify information for specifying the manufacturing machine 31 based on the operator identification information.

Figure 2:
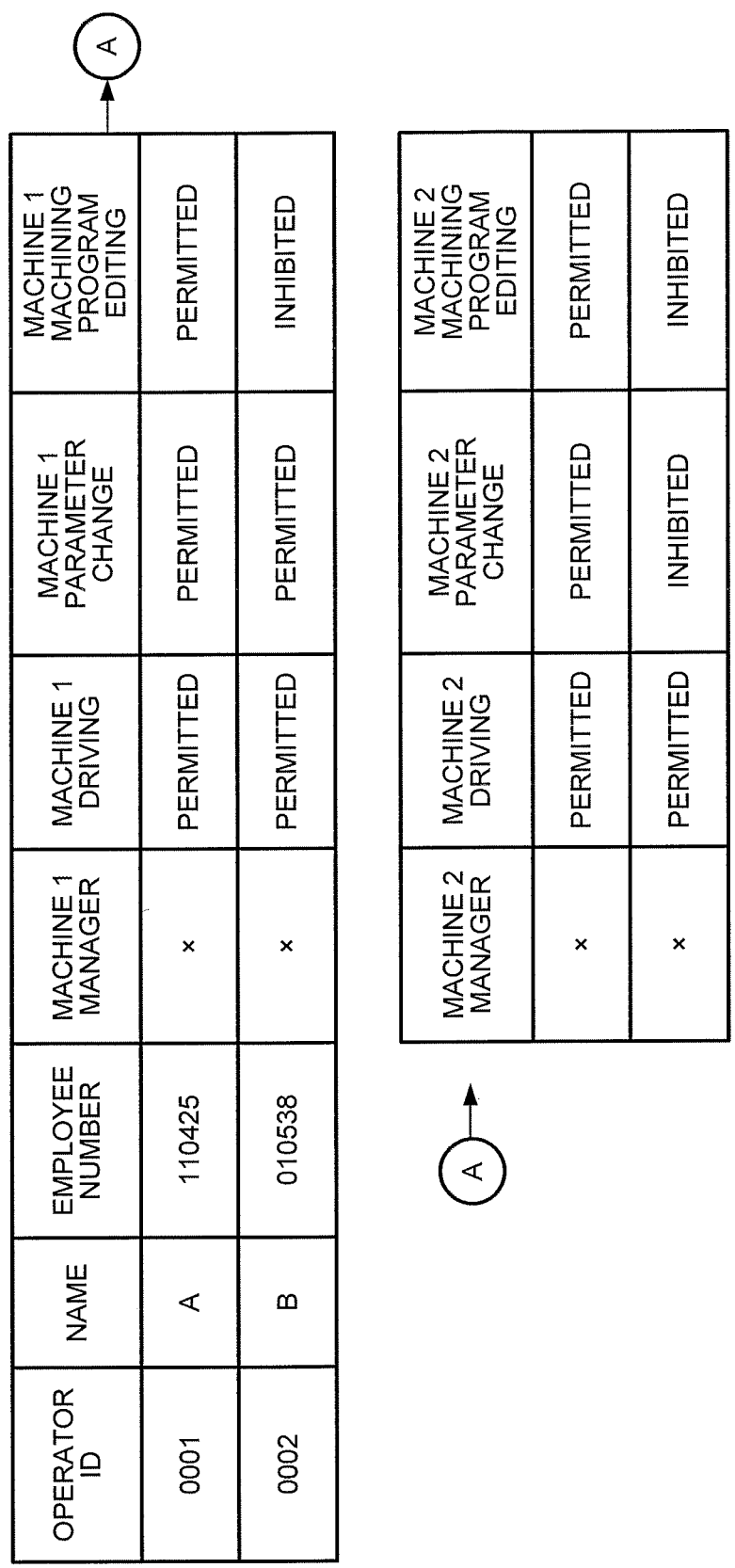
FIG. 2 is a diagram illustrating an example of a first operation permission/inhibition information storage unit.

The first operation permission/inhibition information storage unit 23 is a database that stores, in a corresponding manner, an operator, operator identification information, and information (hereinafter, referred to as operation permission/inhibition information) indicating an operation permitted to the operator in a manufacturing machine. FIG. 2 illustrates an example of the first operation permission/inhibition information storage unit 23. In this example, with respect to the operator specified by an operator ID "0001," operations for driving, parameter change and machining program editing of a machine 1 and driving, parameter change and machining program editing of a machine 2 are set as "permitted." On the other hand, with respect to the operator specified by the operator ID "0002", the operations for driving and parameter change of the machine 1 and driving the machine 2 are set as "permitted," but the operations for machining program editing of the machine 1 and parameter change and machining program editing of the machine 2 are set as "inhibited".

The first operator identification unit 22 identifies the operator who presented the operator identification information and specifies the operation that can be performed by the operator based on information for specifying the operator identification information and the manufacturing machine acquired by the first operator identification information acquisition unit 21 and the information stored in the first operation permission/inhibition information storage unit 23. Upon identifying the operator, the first operator identification unit 22 notifies, via the communication unit 25, the operation that can be performed by the operator to an operation unit 38 included in a control device 32 of each manufacturing machine 31 of each manufacturing cell 30.

The operation history information storage unit 24 receives and stores the operation history information generated by an operation history information acquisition unit 36 to be described later, via the communication unit 25. A machine operation instruction unit 26 transmits an instruction for controlling an operation state of the manufacturing machine 31 via the communication unit 25. For example, the machine operation instruction unit 26 can issue an instruction to dynamically change the manufacturing machine 31 that can be operated or an operation that can be performed by a specific operator based on the operation history information and the like.

Each of the manufacturing cells 30 includes one or more manufacturing machines 31. Each of the manufacturing machines 31 includes a control device 32. The control device 32 includes a second operator identification information acquisition unit 33, a second operator identification unit 34, a second operation permission/inhibition information storage unit 35, an operation history information acquisition unit 36, a communication unit 37, and the operation unit 38.

Like the first operator identification information acquisition unit 21, the second operator identification information acquisition unit 33 is a device that acquires information (hereinafter, referred to as operator identification information) for identifying the operator from the operator. However, it is preferable that the operator identification information acquired by the second operator identification information acquisition unit 33 is a type of information different from the operator identification information acquired by the first operator identification information acquisition unit 21. By doing this, it is possible to improve the security related to operator identification.

Like the first operation permission/inhibition information storage unit 23, the second operation permission/inhibition information storage unit 35 is a database that stores, in a corresponding manner, an operator, operator identification information, and information (hereinafter, referred to as operation permission/inhibition information) indicating an operation permitted to the operator in a manufacturing machine.

The second operation permission/inhibition information storage unit 35 can be created by copying a part or all of the first operation permission/inhibition information storage unit 23 periodically or in a predetermined timing: It is sufficient for the second operation permission/inhibition information storage unit 35 to hold at least operation permission/inhibition information on the manufacturing machine 31 and information related to the operator associated with the pertinent operation permission/inhibition information, that is, the operator who can operate the manufacturing machine 31. FIG. 3 illustrates an example of the second operation permission/inhibition information storage unit 35. It is assumed that the operator having the operator ID "1000" is registered previously in the second operation permission/inhibition information storage unit 35 of the machine 1. The operator ID "1000" is a manager of the machine 1. Here, a record having the operator ID "0002" is transmitted from the first operation permission/inhibition information storage unit 23 and added. The operator ID "0002" is the operator for whom only driving and parameter change of the machine 1 are "permitted," and machining program editing is "inhibited."

The second operator identification unit 34 identifies the operator who presented the operator identification information and specifies the operation that can be performed by the operator based on the operator identification information acquired by the second operator identification information acquisition unit 33 and the information stored in the second operation permission/inhibition information storage unit 35. Upon identifying the operator, the second operator identification unit 34 notifies the operation unit 38 of the operation that can be performed by the operator.

The operation history information acquisition unit 36 generates a log of the operation (hereinafter referred to as operation history information) for the manufacturing machine 31 or the control device 32, which is performed by the operator via the operation unit 38. At this time, the operation history information acquisition unit 36 records the operator who performed the operation together with operation contents in the operation history information. Here, the operation history information acquisition unit 36 can regard the operator identified by the second operator identification unit 34 as the operator who performed the operation. The operation history information acquisition unit 36 transmits the generated operation history information to the operation history information storage unit 24 via the communication unit 37 periodically or at a predetermined timing.

FIG. 4 illustrates an example of operation history information generated by the operation history information acquisition unit 36 and stored in the operation history information storage unit 24. In this example, the operator ID of the operator who performed the operation and the time at which the operation was performed are recorded together with information indicating the manufacturing machine on which the operation was performed and the contents of the operation performed.

The operation unit 38 accepts an operation, for example, a key input or a button operation by the operator on the manufacturing machine 31 or the control device 32. At this time, the operation unit 38 accepts only operations that can be performed by the operator, which are notified from the first operator identification unit 22 or the second operator identification unit 34.

According to the present embodiment, it is possible to identify the operator in any one of the cell controller 20 and the manufacturing cell 30. Therefore, even if communication between the cell controller 20 and the manufacturing cell 30 is broken, for example, it is possible to identify the operator on the manufacturing cell 30 side, so that an operation of the manufacturing cell 30 can be continued. However, since the operator identification information and operation permission/inhibition information can be managed centrally on the cell controller 20 side, management of information is not complicated.

Figure 5:
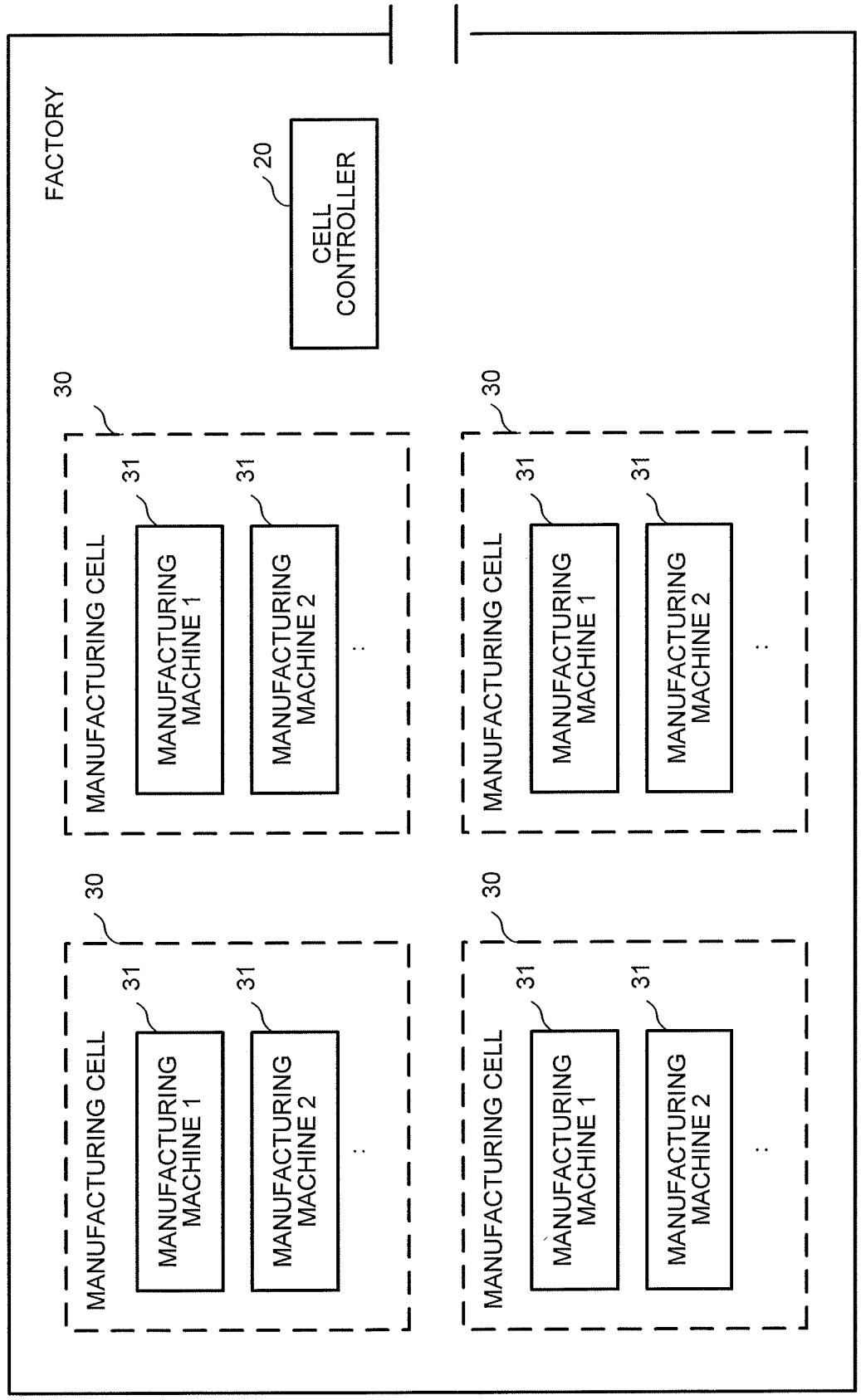
FIG. 5 is a diagram illustrating an embodiment of the operator identification system.

Hereinafter, operation of the operator identification system 10 will be described using several embodiments. In the following embodiments, it is assumed that the cell controller 20 is installed near an entrance of a factory as shown in FIG. 5. In addition, one or more manufacturing cells 30 are provided in the factory, and one or more manufacturing machine 31 is installed in each manufacturing cell 30.

Typically, the manufacturing cell 30 is surrounded by a fence or the like, and entering of the operator other than an operator having an operation authority to operate the manufacturing machine 31 is limited.

First Embodiment

In the first embodiment, it is assumed that a policy exists in which only one operator is assigned to one manufacturing machine 31 on the cell controller 20 side. On the other hand, it is assumed that a policy exists in which a plurality of operators may be assigned to one manufacturing machine 31 on the manufacturing machine 31 side. In addition, it is assumed that both the first operation permission/inhibition information storage unit 23 and the second operation permission/inhibition information storage unit 35 have operation permission/inhibition information illustrated in FIG. 6.

First, it is assumed that an operator B performs an operator identification processing in the first operator identification information acquisition unit 21 of the cell controller 20 installed at the entrance of the factory. Thus, the operator B is given an operation authority of driving and parameter change of the machine 1 (manufacturing machine 31) according to operation permission/inhibition information illustrated in FIG. 6.

Subsequently, it is assumed that an operator A performs the operator identification processing similarly in the first operator identification information acquisition unit 21 of the cell controller 20 installed at the entrance of the factory. According to the operation permission/inhibition information illustrated in FIG. 6, the operator A also has an operation authority of driving and parameter change of the machine 1. However, operator A is not given the operation authority on the machine 1 due to the policy of the cell controller 20 in which only one operator is assigned to one manufacturing machine 31.

Subsequently, it is assumed that the operator A stands in the manufacturing cell in the factory and performs the operator identification processing in the second operator identification information acquisition unit 33 of the machine 1. Since the manufacturing machine 31 has a policy that a plurality of operators may be assigned to one manufacturing machine 31, the operator A is given the operation authority of driving and parameter change of the machine 1 in accordance with the operation permission/inhibition information illustrated in FIG. 6.

At this time, two operators are able to perform operations on the machine 1 in the manufacturing cell, but it is difficult for the machine 1 to distinguish these operators. Preferably, the second operator identification unit 34 performs a process of adjusting the operation authorities of all of the plurality of operators according to the operator having the most limited authority. In the example of FIG. 6, the operator A has the authority to edit the machining program originally. However, in accordance with the operator B who does not have the authority, the operator A is also deprived of the authority to edit the machining program. Thus, it is possible to avoid in advance various problems that can be caused by the operator B performing an operation that is not originally permitted.

When another operator having the operation authority of the manufacturing machine 31 tries to perform the operator identification process while an operator is operating the manufacturing machine 31, the first operator identification unit 22 or the second operator identification unit 34 may instruct the operation unit 38 not to accept the operation by the operator who has already started the operation. In this case, it is necessary for the operator who has already started the operation to perform the operator identification process again. This allows the previous operator to explicitly check changes in the operator and the operation authority.

Second Embodiment

In the second embodiment, the first operator identification unit 22 and the second operator identification unit 34 stop the operation permission given to the operator when a predetermined period of time elapses since the operator identification processing is performed. In other words, control is performed so that the operation of the manufacturing machine 31 cannot be performed until the operator identification processing is performed again.

First, it is assumed that the operator B performs the operator identification processing by fingerprint information in the first operator identification information acquisition unit 21 of the cell controller 20 installed at the entrance of the factory. Thus, the operator B is given a predetermined operation authority for the machine 1 (the manufacturing machine 31).

When a predetermined period of time has elapsed while the operator B is using the machine 1, the first operator identification unit 22 instructs the operation unit 38 not to accept the operation by the operator B. Thus, the operator B performs the operator identification processing using the IC card in the second operator identification information acquisition unit 33 of the machine 1.

Thus, the operator B is given a predetermined operation authority for the machine 1 (the manufacturing machine 31) again.

In this case, with respect to the first operator identification processing and the second operator identification processing, it may be restricted to perform the operator identification processing using different operator identification information. That is, for example, in the first operator identification processing, if the first operator identification unit 22 performs an identification using fingerprint information, the second operator identification unit 34 that performs the second operator identification process performs identification using information, for example, an IC card, other than the fingerprint without accepting the identification using the fingerprint information. Thus, it is possible to further improve a security level. It is preferable that the biological information is used in the first operator identification unit 22. This is because it is difficult to acquire biological information in the second operator identification unit 34 since the operator wears protective devices such as goggles and gloves during operation of the manufacturing machine.

The operator identification processing may be performed again, not only when a predetermined period of time has elapsed while the manufacturing machine 31 is in use but also, for example, when there is a problem in communication state of the communication unit 25 or 37, when the operation unit 38 is not operated for a predetermined period of time, when an instruction is given by the machine operation instruction unit 26 of the cell controller 20, or the like.

FIG. 7 illustrates an example of log information of the operator identification process acquired in the second embodiment. In the first line, the operator B was identified by fingerprint information in the cell controller 20. After a predetermined period of time, in the fourth line, the same operator B is now identified by IC card in the machine 1 of cell 1.

Third Embodiment

In the third embodiment, the second operator identification unit 34 on the manufacturing machine 31 side performs operator identification processing. If the second operation permission/inhibition information storage unit 35 does not have operator identification information and operation permission/inhibition information, it communicates with the cell controller 20 to acquire necessary information from the first operation permission/inhibition information storage unit 23.

Figure 8:
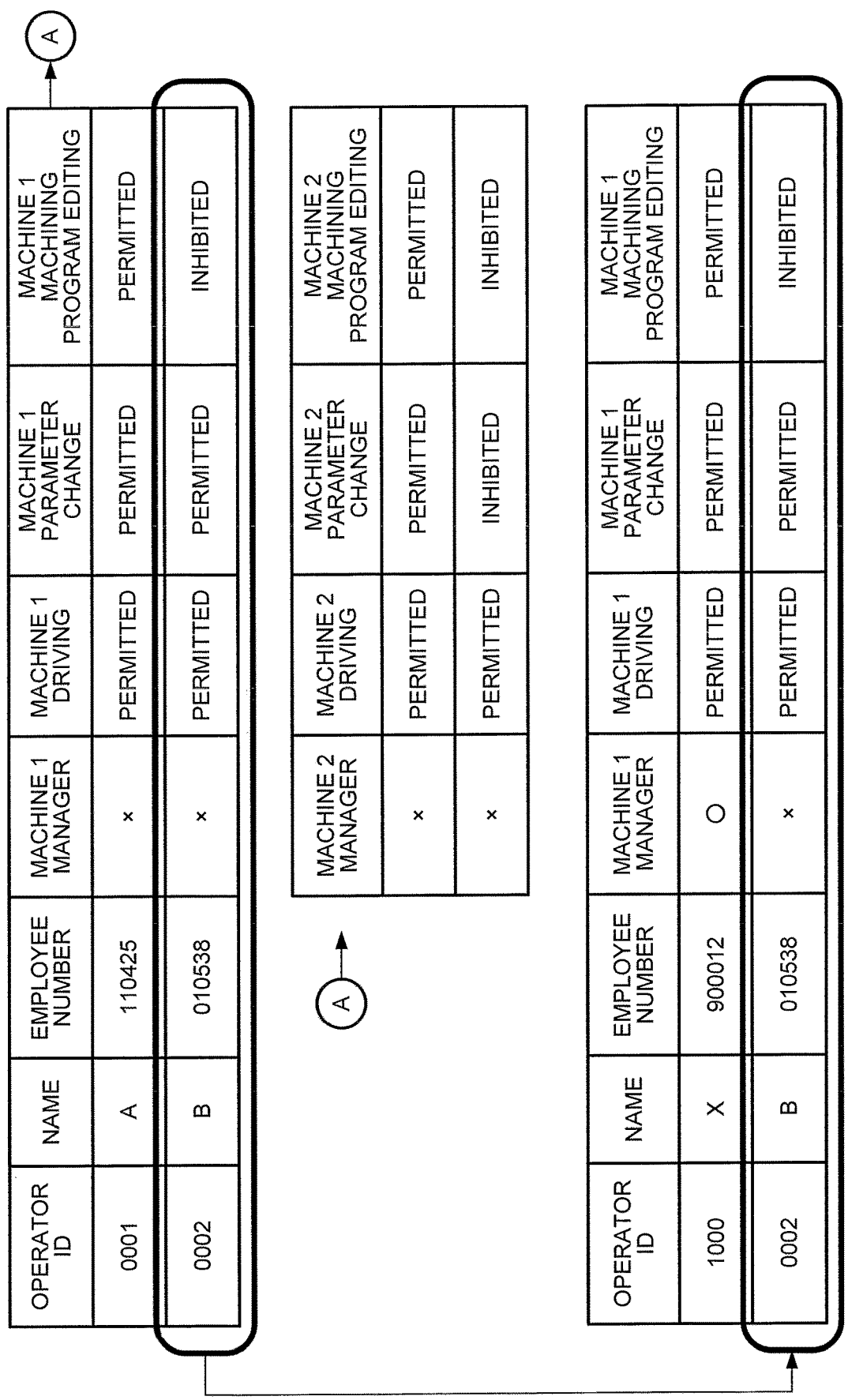
FIG. 8 is a diagram illustrating an example of a second operation permission/inhibition information storage unit in an embodiment.

First, the operator B does not perform the operator identification process in the cell controller 20 installed at the entrance of the factory, and the operator identification information is presented by the second operator identification information acquisition unit 33 of the machine 1. The second operator identification unit 34 refers to the second operation permission/inhibition information storage unit 35, but there is no operator identification information and operation permission/inhibition information of the operator B. At this time, the second operator identification unit 34 communicates with the cell controller 20 via the communication unit 37 to request transmission of operator identification information and operation permission/inhibition information relating to the operator B. In response to the request, the cell controller 20 extracts information relating to the operator B from the first operation permission/inhibition information storage unit 23, and transmits the extracted information to the control device 32. The second operation permission/inhibition information storage unit 35 stores the received operator identification information and the operation permission/inhibition information of the operator B (see FIG. 8). The second operator identification unit 34 gives the operation authority of the machine 1 to the operator B based on the information stored in the second operation permission/inhibition information storage unit 35.

Fourth Embodiment

As the fourth embodiment, an example is illustrated in which the contents of the operation history information storage unit 24 is displayed on a display unit (not illustrated) of the cell controller 20 (FIG. 9). In this example, the operations performed in machines 1, 2, 3, and the like respectively in a manufacturing cell are displayed in association with operator IDs and execution times. In this embodiment, the operation history information is sorted and displayed for each manufacturing machine 31. However, the operation history information may be sorted and displayed based on, for example, the operator ID or the execution time.

Finally, an operation of the operator identification system 10 will be described using flowcharts of FIGS. 10 to 13.

Figure 10:
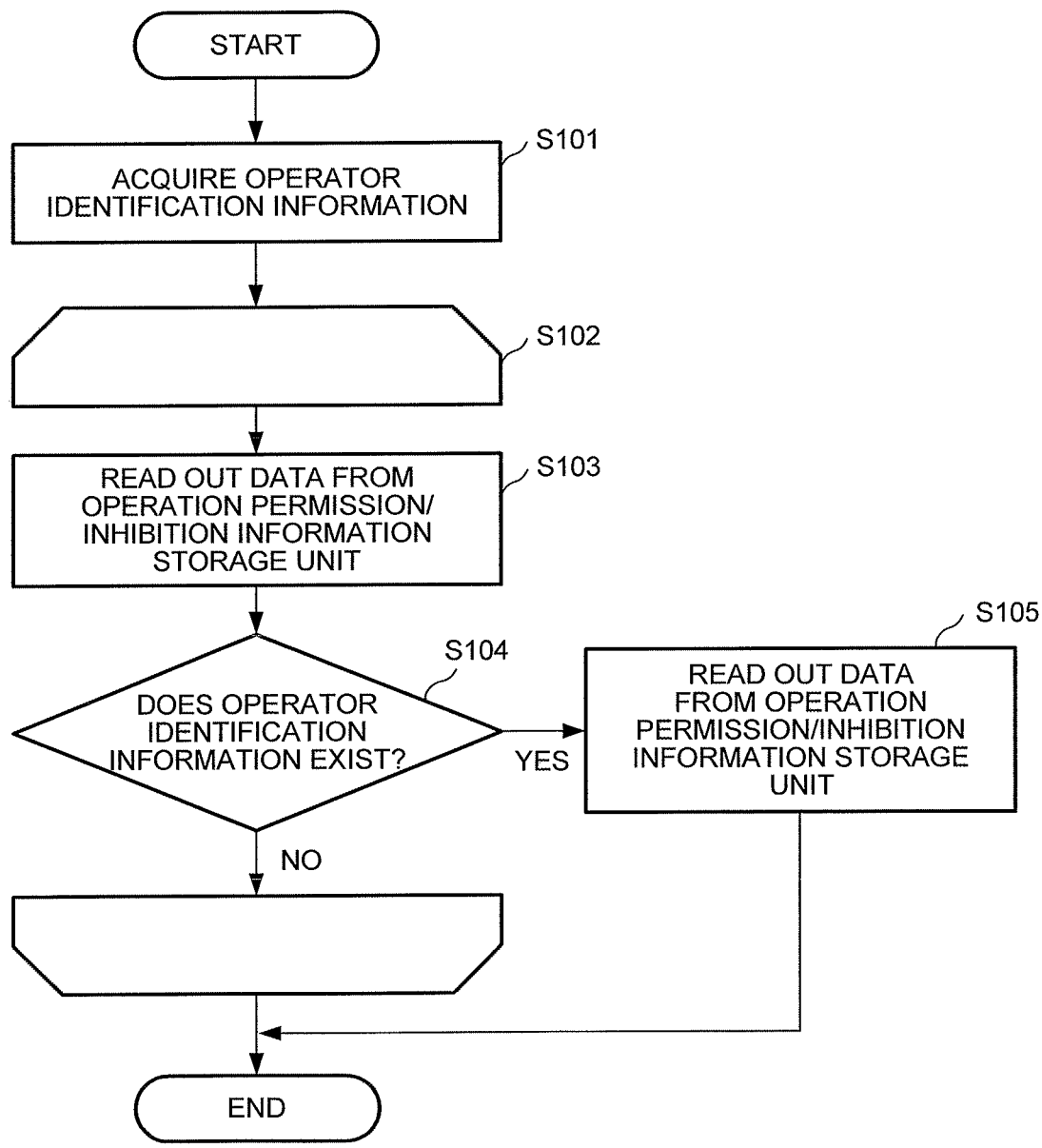
FIG. 10 is a flowchart illustrating an operator identification processing by a first operator identification unit and a second operator identification unit.

FIG. 10 is a flowchart of the operator identification processing by the first operator identification unit 22 and the second operator identification unit 34.

S101: The first operator identification unit 22 or the second operator identification unit 34 acquires the operator identification information from the first operator identification information acquisition unit 21 or the second operator identification information acquisition unit 33.

S102: The first operator identification unit 22 or the second operator identification unit 34 refers to the first operation permission/inhibition information storage unit 23 or the second operation permission/inhibition information storage unit 35, and repeats steps after S103 by the number of records of the registered operator.

S103: The first operator identification unit 22 or the second operator identification unit 34 reads the records sequentially, one by one, from the first operation permission/inhibition information storage unit 23 or the second operation permission/inhibition information storage unit 35.

S104: The first operator identification unit 22 or the second operator identification unit 34 determines whether or not the operator identification information included in the record read out in S103 matches the operator identification information acquired in S101. In the case of matching, the process proceeds to S105. In other cases, the process returns to S103.

S105: The operation permission/inhibition information of the operator matched in S104 is read out. In the case of the operator identification processing by the first operator identification unit 22, the operation permission/inhibition information is transmitted to the control device 32.

Figure 11:
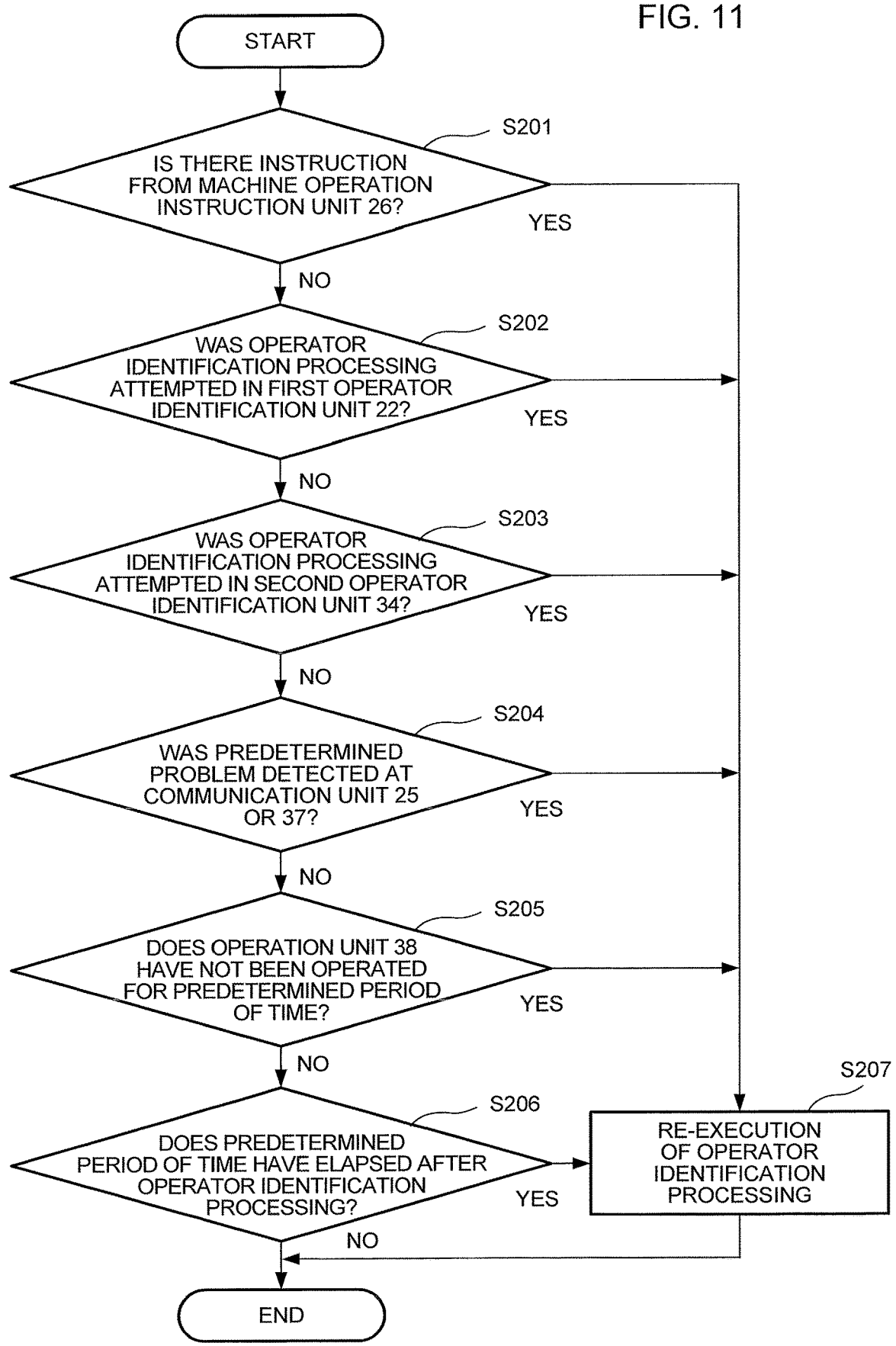
FIG. 11 illustrates a flowchart for re-execution of an operator identification process.

FIG. 11 illustrates a flowchart for re-execution of the operator identification process. The second operator identification unit 34 executes the processing in S207 in the case of one of the following S201 to S206.

S201: When an instruction is issued by the machine operation instruction unit 26.

S202: When the operator identification process is attempted in the first operator identification unit 22.

S203: When the operator identification processing is attempted in the second operator identification unit 34.

S204: When a predetermined problem is detected in the communication unit 25 or 37.

S205: When the operation unit 38 is not operated for a predetermined period of time.

S206: When a predetermined period of time has elapsed after the operator identification processing in the first operator identification unit 22 or the second operator identification unit 34.

S207: Stop accepting the operation in the operation unit 38. The operator identification processing is received again in the first operator identification unit 22 or the second operator identification unit 34.

Figure 12:
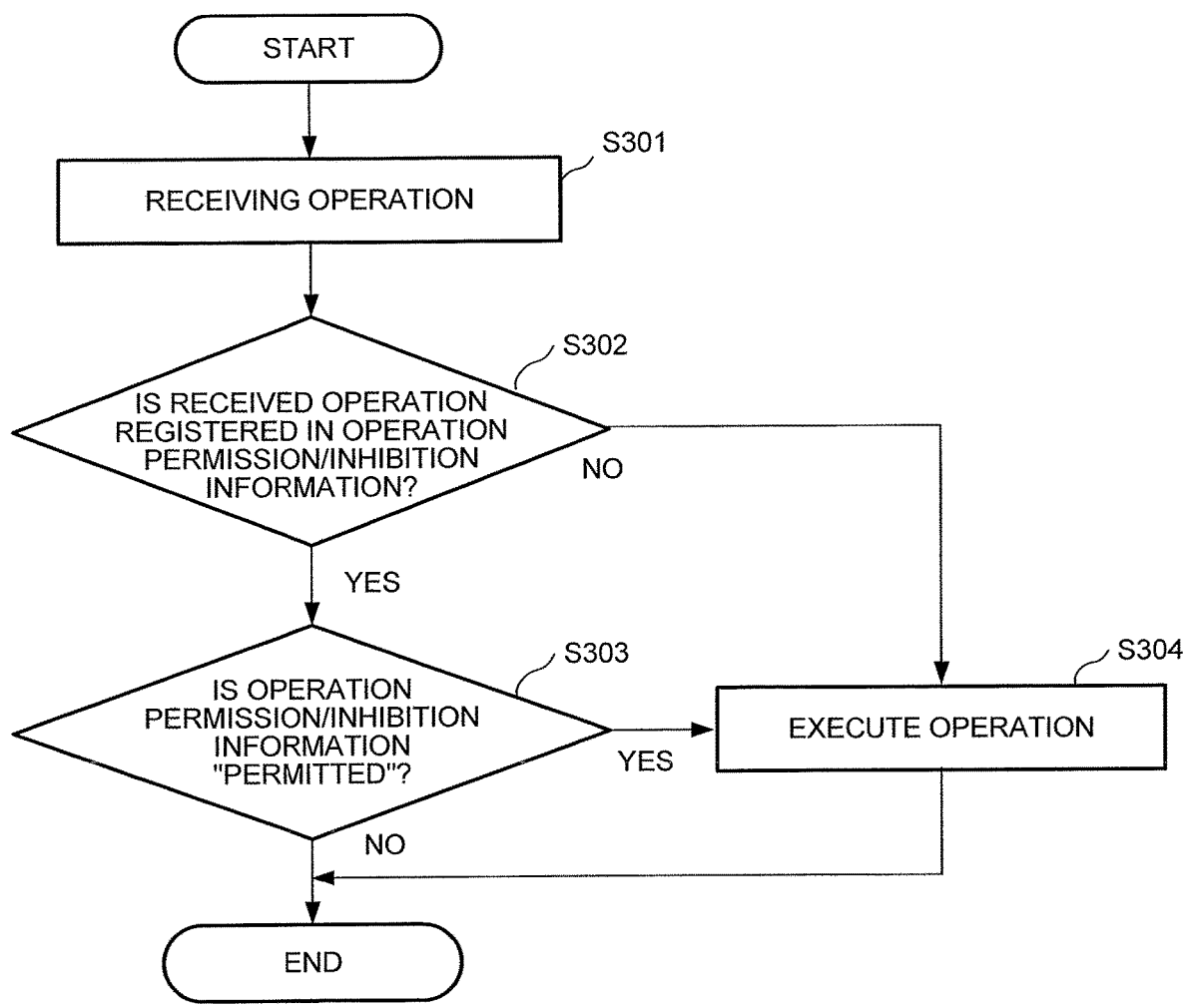
FIG. 12 is a flowchart of a process in which an operation unit determines whether or not an operation can be performed based on an operation permission/inhibition information.

FIG. 12 is a flowchart of a process in which the operation unit 38 determines permission/inhibition of executing the operation based on the operation permission/inhibition information.

S301: The operation unit 38 accepts the operation by the operator.

S302: The operation unit 38 compares the operation accepted in S301 with the operation permission/inhibition information (that is, an operation permitted for the operator) received from the first operator identification unit 22 or the second operator identification unit 34. If the operation accepted in S301 is the operation described in the operation permission/inhibition information, the process proceeds to S303. In the other cases, the process proceeds to S304.

S303: If the operation accepted in S301 is an operation designated as "permitted" in the operation permission/inhibition information, the process proceeds to S304. In other cases, the process is terminated.

S304: Execute the operation accepted in S301.

FIG. 13 is a flowchart illustrating an aggregation process of the operation history information.

S401: The cell controller 20 collects operation history information from each manufacturing machine 31 of each manufacturing cell 30.

S402: Preferably, the cell controller 20 aggregates or sorts the operation history information for each manufacturing cell 30 and stores them in the operation history information storage unit 24.

S403: The cell controller 20 outputs the operation history information stored in the operation history information storage unit 24 to a display device or the like.

However, the invention is not limited to the aforementioned embodiments, and may be changed appropriately without departing from the spirit. Any constituent elements of the embodiments may be modified or any constituent elements of the embodiments may be omitted within the scope of the invention.

For example, in the present embodiment, the operator identification system 10 is described as having a two-layer structure of the cell controller 20 and the manufacturing cell 30. However, the invention is not limited thereto, and, for example, may include a production planning apparatus, etc. as a host apparatus of the cell controller 20. In this case, for example, one or both of the first operation permission/inhibition information storage unit 23 and the operation history information storage unit 24 may be included in the production planning apparatus.

In addition, the table configuration, the parameter configuration, flowchart, and the like illustrated in the aforementioned embodiments are merely examples, and any other configuration may be adopted as long as the gist of the invention can be achieved.

Further, in the embodiments described above, machine tools, robots, and PLCs have been exemplified as examples of manufacturing machines. However, the invention is not limited to these examples. For example, the invention may be applied to any machine, such as a conveying machine and a packaging machine, used for manufacturing products.

Although the embodiments of the invention have been described above, the invention is not limited to the aforementioned embodiments, but may be implemented in other forms by making appropriate changes.

The invention claimed is:

1. An operator identification system including one or more manufacturing cells including one or more manufacturing machines operated by an operator and a cell controller connected to each of the manufacturing machines communicatively, wherein the cell controller includes:
  a first operator identification information acquisition unit for acquiring operator identification information for identifying the operator;
  a first operation permission/inhibition information storage unit for storing operation permission/inhibition information indicating an operation executable on the manufacturing machine by the operator; and
  a first operator identification unit for determining an operation executable on the manufacturing machine by the operator based on the operator identification information and the operation permission/inhibition information, wherein the manufacturing machine includes:
  a second operator identification information acquisition unit for acquiring operator identification information for identifying the operator;
  a second operation permission/inhibition information storage unit for storing operation permission/inhibition information indicating the operation executable on the manufacturing machine by the operator;
  a second operator identification unit for determining an operation executable on the manufacturing machine by the operator based on the operator identification information and the operation permission/inhibition information; and an operation unit for accepting the operation by the operator, and wherein the operation unit executes the operation when the operation by the operator is an operation determined to be executable by the first operator identification unit or the second operator identification unit, and wherein the second operation permission/inhibition information storage unit acquires the operation permission/inhibition information from the first operation permission/inhibition information storage unit in the case where the second operation permission/inhibition information storage unit does not have the operation permission/inhibition information that is necessary for the second operator identification unit to make a determination.

2. The operator identification system of claim 1, wherein the second operator identification unit performs the determination again for the operator when a predetermined condition is satisfied.

3. The operator identification system of claim 2, wherein the second operator identification unit performs the determination again when a predetermined period of time has elapsed after the first operator identification unit or the second operator identification unit determines a predetermined operation to be executable.

4. The operator identification system of claim 2, wherein the second operator identification unit performs the determination again when a problem occurs in a communication between the manufacturing machine and the cell controller.

5. The operator identification system of claim 2, wherein the second operator identification unit performs the determination again when the operation unit is not operated for a predetermined period of time.

6. The operator identification system of claim 2, wherein the cell controller further includes a machine operation instruction unit for controlling an operation state of the manufacturing machine, and wherein the second operator identification unit performs the determination again when an instruction is given by the machine operation instruction unit.

7. The operator identification system of claim 2, wherein, when the predetermined condition is satisfied, the operation unit stops executing the operation until the first operator identification unit or the second operator identification unit performs the determination for the operator again.

8. The operator identification system of claim 2, wherein, when the determination is performed again with respect to the operator, the first operator identification unit or the second operator identification unit uses the operator identification information different from that used in a previous determination.

9. The operator identification system of claim 1, wherein the first operator identification information acquisition unit acquires the operator identification information from any one of biological information of the operator, secret information stored by the operator, and an equipment possessed by the operator, and wherein the second operator identification information acquisition unit acquires the operator identification information from any one of the secret information stored by the operator and the equipment possessed by the operator.

10. The operator identification system of claim 1, wherein when a plurality of the operators attempt to operate the manufacturing machine, the first operator identification unit or the second operator identification unit performs only the operation by at least one operator.

11. The operator identification system of claim 1, wherein, when a plurality of the operators perform an operation on the manufacturing machine, the first operator identification unit or the second operator identification unit restricts authorities of all the operators to a same scope of authority as that of the operator with a fewest executable operations from among the plurality of the operators.

12. The operator identification system of claim 1, wherein the manufacturing machine further includes an operation history information acquisition unit for acquiring operation history information including information regarding operation performed on the manufacturing machine and information regarding the operator who performed the operation, and wherein the cell controller further includes an operation history information storage unit for acquiring and storing the operation history information from the operation history information acquisition unit.

* * * * *